United States Patent
Oak

(10) Patent No.: US 7,339,912 B2
(45) Date of Patent: Mar. 4, 2008

(54) WIRELESS LAN CARD HAVING ACCESS POINT FUNCTION, NETWORK PRINTER HAVING THE SAME, AND METHOD FOR TRANSMITTING DATA USING THE NETWORK PRINTER

(75) Inventor: Seung-soo Oak, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1164 days.

(21) Appl. No.: 10/309,157

(22) Filed: Dec. 4, 2002

(65) Prior Publication Data

US 2003/0156567 A1 Aug. 21, 2003

(30) Foreign Application Priority Data

Feb. 20, 2002 (KR) .................................. 2002-9085

(51) Int. Cl.
*H04B 7/14* (2006.01)
*H04Q 7/24* (2006.01)
*H04J 3/00* (2006.01)

(52) U.S. Cl. ..................... 370/338; 370/445; 370/315

(58) Field of Classification Search ............ 455/426.1, 455/426.2, 41.1, 41.2, 444; 370/338, 445, 370/315
See application file for complete search history.

(56) References Cited

U.S. PATENT DOCUMENTS

| 6,665,536 | B1* | 12/2003 | Mahany | 455/432.1 |
| 6,891,820 | B1* | 5/2005 | Pham et al. | 370/338 |
| 2001/0051530 | A1* | 12/2001 | Shiotsu et al. | 455/522 |
| 2004/0141487 | A1* | 7/2004 | Lee | 370/338 |

FOREIGN PATENT DOCUMENTS

| KR | 1994-951 | 1/1994 |
| KR | 1996-12855 | 4/1996 |
| KR | 2000-13643 | 3/2000 |

* cited by examiner

*Primary Examiner*—Tilahun Gesesse
(74) *Attorney, Agent, or Firm*—Staas & Halsey LLP

(57) ABSTRACT

A wireless network printer that can access a cable LAN and has an access point function. The wireless network printer includes a wireless LAN card that receives predetermined data from a wireless LAN card of a first wireless client and transmits the data to a cable client connected to a cable LAN or a wireless LAN card of a second wireless client, and a printer processor that receives the data output from the wireless LAN card having the access point function. The wireless network printer provides an access point function in a wireless LAN and allows wire/wireless network printing.

28 Claims, 6 Drawing Sheets

WIRELESS LAN CARD HAVING ACCESS POINT FUNCTION, NETWORK PRINTER HAVING THE SAME, AND METHOD FOR TRANSMITTING DATA USING THE NETWORK PRINTER

CROSS-REFERENCE TO RELATED APPLICATIONS

This application claims the benefit of Korean Application No. 2002-9085 filed Feb. 20, 2002, in the Korean Intellectual Property Office, the disclosure of which is incorporated herein by reference.

BACKGROUND OF THE INVENTION

1. Field of the Invention

The present invention relates to a network printer and a method of transmitting data by the network printer, and more particularly, to a wireless local area network (LAN) card having an access point function, a network printer having the LAN card, and a method of transmitting data by the network printer via wire/wireless transmission.

2. Description of the Related Art

A wireless local area network (LAN), which adopts the standard protocol, IEEE 802.11b, creates a network with wireless network devices, such as a desktop computer, a lap top computer, and a wireless network printer, with a 100-meter radius (a radius of 30 meters in an office with a number of interfering objects), using a radio frequency of 2.4 GHz.

FIG. 1 is a view of a conventional wireless network printing system that includes a cable LAN 20, an access point 30 that is typically electrically connected to the cable LAN 20, wireless clients 40 and 50, and a printer 60.

Each of the wireless clients 40 and 50 and the printer 60 includes a wireless LAN card that transmits/receives predetermined data by radio. The access point 30 is a fixed (stationary) unit that functions as a hub between the wireless clients 40 and 50 and the printer 60 each of which includes the wireless LAN card.

In case of short unobstructed distances among the wireless printer 60 and the wireless clients 40 or 50, the wireless printer 60 having the wireless LAN card can receive printing data directly from the wireless LAN card of the wireless client 40 or 50 and output the data. Because a repeater, such as the access point 30, is not used in this case, the distance between the printer 60 and the wireless client 40 or 50 becomes shorter. Therefore, the conventional wireless network printing system is able to transmit printing data when there is no obstacle between the printer 60 and the wireless client 50.

On the contrary, if the distance among the printer 60 and the wireless client 40 or 50 becomes long and there is an obstacle between the printer 60 and the wireless client 40 or 50, the access point 30 having a repeating function is inevitably required. In the event that the printer 60 having a wireless LAN card is installed in a large office having many obstacles between the printer 60 and the wireless client 40 or 50, the printer 60 receives printing data from the wireless LAN card of the wireless client 40 or 50 via the access point 30 and prints the printing data. However, in this case, the access point 30 is fixed at a certain point in the office, and thus, a plurality of access points are required to accommodate wireless communication among the wireless printer 60 and the wireless clients 40 or 50 outside of a communication range of a given access point 30.

SUMMARY OF THE INVENTION

An object of the present invention is to provide a wireless network printer that is mobile and has a wireless local area network (LAN) card having an access point function, and a method of transmitting data via the wireless network printer, thereby providing a mobile access point.

Another object of the present invention is to provide a wireless LAN card having an access point function.

Additional objects and advantages of the invention will be set forth in part in the description which follows and, in part, will be obvious from the description, or may be learned by practice of the invention.

The present invention may be achieved by a method of transmitting data using a wireless network printer, comprising providing in the printer a wireless LAN card that has an access point, receiving via the access point predetermined data transmitted from a wireless LAN card of a first wireless client, and transmitting via the access point the data to a wireless LAN card of a second wireless client.

According to another embodiment of the invention, there is provided a method of transmitting data using a wireless network printer by providing in the printer a wireless LAN card that is in communication with a cable LAN and has an access point, receiving via the access point predetermined data from a wireless LAN card of a wireless client, and transmitting via the access point the data to a cable client connected to the cable LAN.

According to another embodiment of the invention, there is provided a method of transmitting data using a wireless network printer by providing in the printer a wireless LAN card that is connected to a cable LAN and has an access point, receiving via the access point predetermined data from a cable client connected to the cable LAN, and transmitting via the access point the data to a wireless LAN card of a wireless client.

In an aspect of the invention, the data transmission to the wireless LAN card includes detecting a target Internet protocol of the data and transmitting the data to the wireless LAN card of the wireless client which corresponds to the target internet protocol.

According to another embodiment of the invention, there is provided a method of transmitting data using a wireless network printer by providing in the printer a wireless LAN card that is connected to a cable LAN and has an access point, receiving via the access point first data transmitted from a first client, and detecting a target Internet protocol of the first data and transmitting via the access point second data to a second client which corresponds to the target Internet protocol.

In an aspect of the invention, frame formats of the first data and second data are the same in the event that the first client is a wireless client having a first wireless LAN card and the second client is a wireless client having a second wireless LAN card.

In an aspect of the invention, frame formats of the first data and second data are different from each other in the event that the first client is the first wireless client having a wireless LAN card and the second client is a cable client connected to the cable LAN. Also, frame formats of the first data and second data are different from each other in the event that the first client is a cable client connected to the cable LAN and the second client is a wireless client having a wireless LAN card.

According to another embodiment of the invention, there is provided a wireless network printer comprising a wireless LAN card with an access point that via the access point receives predetermined data from a wireless LAN card of a first wireless client and transmits the data to a cable client connected to a cable LAN or a wireless LAN card of a second wireless client, and a printer processor that receives the data output from the wireless LAN card having the access point.

According to an aspect of the invention, the wireless LAN card having the access point transmits data received from the cable client, which is connected to the wireless LAN card having the access point, to the wireless LAN card of the first wireless client or the wireless LAN card of the second wireless client.

In an aspect of the invention, the wireless LAN card having the access point comprises an access processor receiving the data from the wireless LAN card of the first wireless client, and transmitting the data to the cable client connected to the cable LAN or the wireless LAN card of the second wireless client; and an interface connected between the access processor and the printer processor, the interface interfacing the access processor and the printer processor.

In an aspect of the invention, the interface comprises a memory receiving and storing the data from the wireless LAN card of the first wireless client, a bus arbiter arbitrating a bus connected between the printer processor and the access processor, and an interface logic interfacing the printer processor and the access processor.

According to another embodiment of the invention, there is provided a wireless LAN card comprising an access processor receiving data output from a wireless LAN card of a first wireless client and transmitting the data to a cable LAN connected to the wireless LAN card or a wireless LAN card of a second wireless client; and an interface transmitting the data output from the access processor to an output terminal of the wireless LAN card.

In an aspect of the invention, the access processor receives the data from the cable LAN and transmits the data to the wireless LAN card of the first client or the wireless LAN card of the second client.

In an aspect of the invention, the interface comprises a memory storing the data transmitted from the wireless LAN card of the first wireless client, a bus arbiter arbitrating a bus connected between the output terminal of the wireless LAN card and the access processor, and an interface logic interfacing the output terminal of the wireless LAN card and the access processor.

BRIEF DESCRIPTION OF THE DRAWINGS

The above and other objects and advantages of the present invention will become more apparent by describing in detail preferred embodiments thereof with reference to the attached drawings in which.

DETAILED DESCRIPTION OF THE PREFERRED EMBODIMENTS

Figure 1:
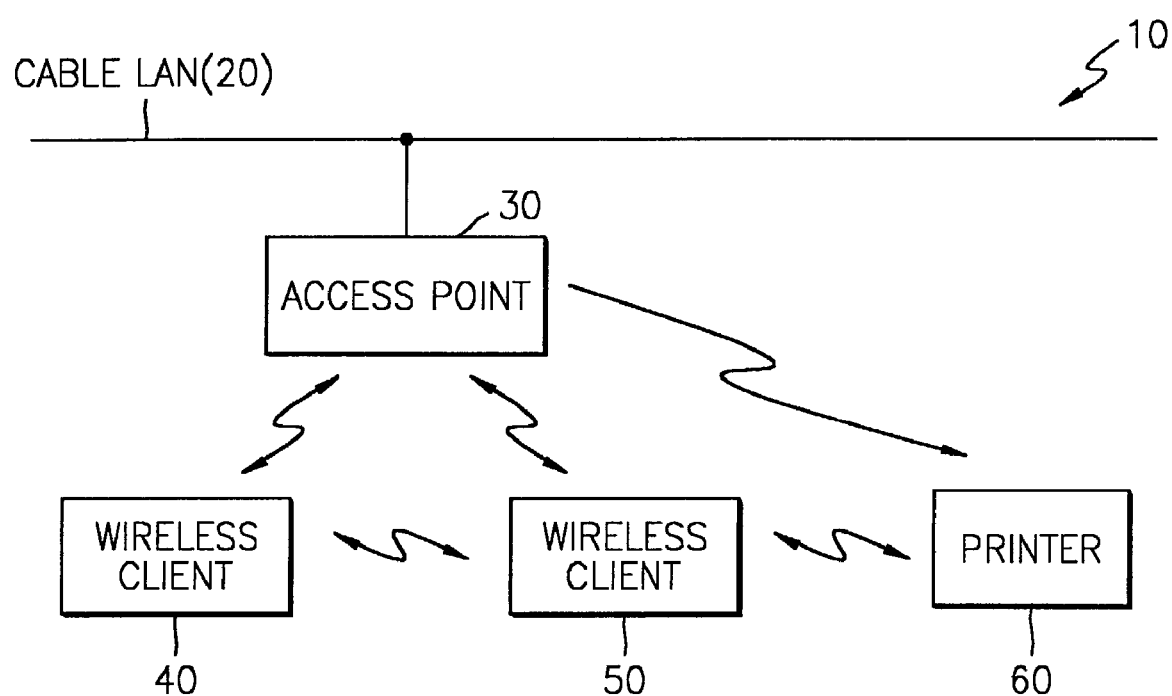
FIG. 1 is a block diagram of a conventional wireless network printing system.

The present invention now will be described more fully with reference to the accompanying drawings, in which preferred embodiments of the invention are shown. This invention may, however, be embodied in many different forms and should not be construed as being limited to the embodiments set forth herein. Rather, these embodiments are provided so that this disclosure will be thorough and complete, and will fully convey the concept of the invention to those skilled in the art. The same reference numerals in different drawings represent the same element, and thus their description will be omitted.

Figure 2:
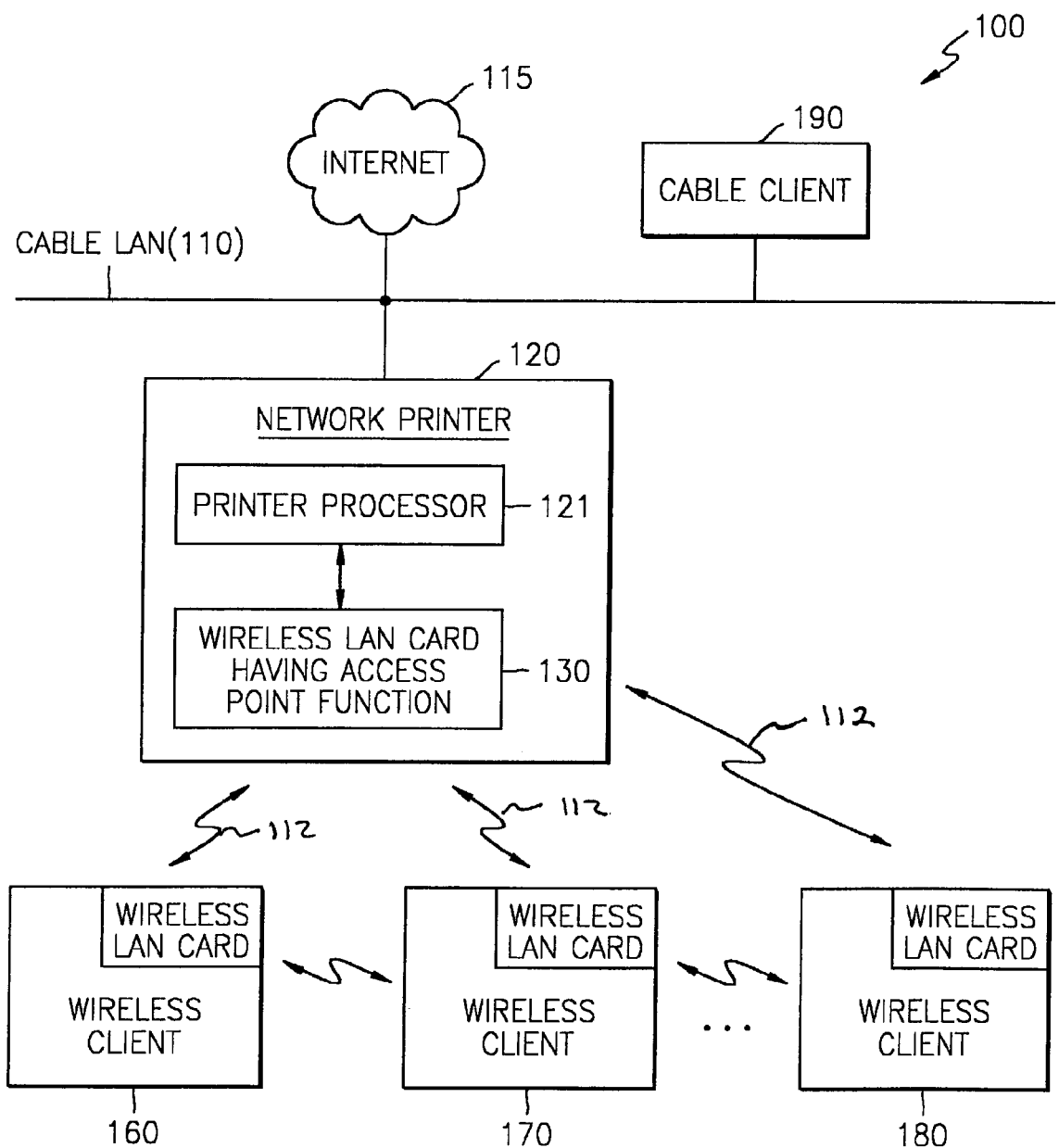
FIG. 2 is a block diagram of a wireless network printing system according to an embodiment of the present invention.

FIG. 2 is a block diagram of a wireless network printing system 100 according to an embodiment of the present invention. The wireless network printing system 100 includes a network printer 120, a cable client 190, an Internet 115, a cable local area network (LAN) 110 that allows data communication among the network printer 120, the cable client 190, the Internet 115, and a plurality of wireless clients 160, 170, . . . , and 180.

Here, each of the wireless clients 160, 170, . . . , and 180 may be a desktop computer, a lap top computer, a notebook computer, a scanner, a facsimile, or the like. Also, the cable client 190 may be a desktop computer, a lap top computer, a notebook computer, a scanner, or a facsimile, which is connected to the cable LAN 110 via a cable LAN card.

The network printer 120 comprises a printer processor 121, and a wireless LAN card 130 having an access point function. The network printer 120 is connected to the cable LAN 110 via the access point function 130 and a predetermined connector. Further, the network printer 120 is in communication with the wireless clients 160, 170, . . . , and 180 via the access point function 130.

The wireless LAN card 130 having an access point function can receive data from the wireless LAN card of the wireless client 160 and transmit the data to either the cable client 190 connected to the cable LAN 110 or the wireless LAN card of the wireless client 170. The printer processor 121 can receive the predetermined data from the wireless LAN card 130. The printer processor 121 is an apparatus controlling the printing of the network printer 120.

Further, each wireless client 160, 170, . . . , and 180 can transmit/receive data to/from the Internet 115 or the cable client 190 via the network printer 120 and also, transmit/receive data directly to/from the wireless clients 160, 170, . . . , or 180.

Further, the printer processor 121 can receive printing data output from the cable client 190, as well as each wireless client 160, 170, . . . , or 180, and print the printing data.

Further, the network printer 120 having an access point function with respect to each wireless client 160, 170, . . . , or 180, can function as a repeater between each wireless client 160, 170, . . . , or 180, and the Internet 115 or the cable client 190.

More particularly, the network printer 120 having the wireless LAN card 130 can receive predetermined data transmitted by the wireless LAN card of the wireless client 160 and transmit the received data to the wireless LAN card of the wireless client 170 corresponding to a target internet protocol (IP) of the data. Also, the network printer 120 can receive predetermined data transmitted via the wireless LAN card of the wireless client 160, and transmit the data to the cable client 190 connected to the cable LAN 110 corresponding to a target IP of the data. Further, the network printer 120 can receive predetermined data transmitted by the cable client 190 connected to the cable LAN 110, and transmit via the wireless LAN card 130 the data to the wireless LAN card of the wireless client 170 corresponding to a target IP of the data.

In FIG. 2, a wireless LAN 112 can be formed among the wireless clients 160, 170, . . . , and 180 and the wireless printer 120 using any wireless communication protocol, such as (without limitation) the standard protocol IEEE 802.11b, and the cable LAN 110 can be formed using any communication protocol, such as (without limitation) an IEEE 802.3 protocol.

Figure 3:
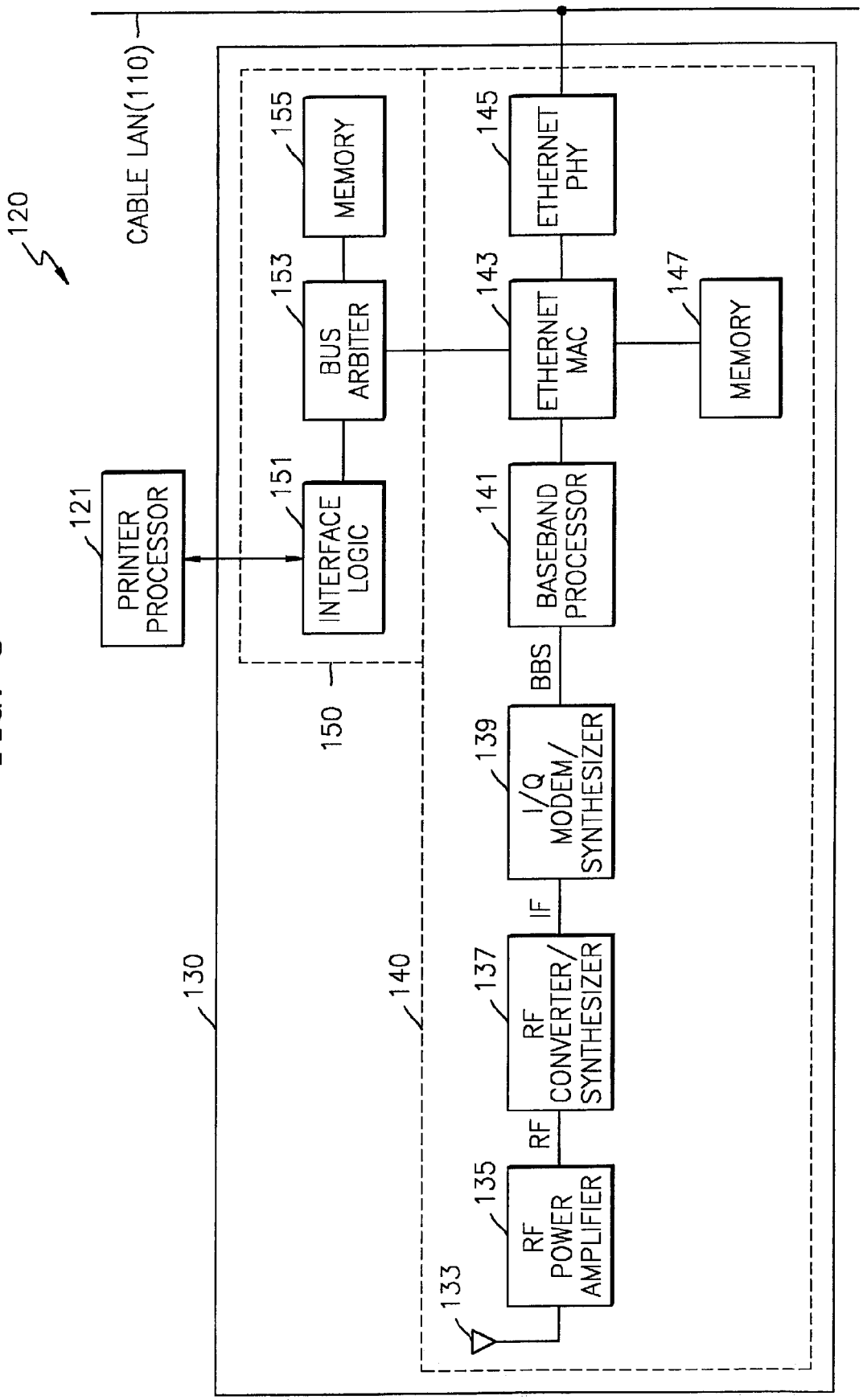
FIG. 3 is a block diagram of a network printer having a wireless LAN card that has an access point function according to an embodiment of the present invention.

FIG. 3 is a block diagram of a printer 120 to which a wireless LAN card 130 having an access point function is attached, according to an embodiment of the present invention. Referring to FIG. 3, the network printer 120 comprises a printer processor 121, and a LAN card 130. The LAN card 130 comprises an access processor 140 and an interface 150 (i.e., collectively embodying an access point function). The functions of the LAN card 130 (access point function/controller) can be embodied in software and/or hardware.

Referring to FIGS. 2 and 3, the access processor 140 receives data from the LAN card of the wireless client 160, and transmits the data to the cable LAN 110, the LAN card of the wireless client 170 or the printer processor 121 corresponding to a target IP of the data.

Further, the access processor 140 receives the data from the cable LAN 110, and outputs the data to the LAN card of the wireless client 160, 170, . . . , or 180 corresponding to a target IP of the data.

Further, the interface 150 receives the data from the access processor 140 and outputs the data to the printer processor 121.

The access processor 140 comprises an antenna 133, a radio-frequency (RF) power amplifier 135, an RF converter/synthesizer 137, an I/Q modem/synthesizer 139, a baseband processor 141, an Ethernet medium processor controller (MAC) 143, an Ethernet physical layer device (PHY) 145, and a memory 147.

The antenna 133 wirelessly transmits and receives a frequency of 2.4 GHz used in the standard protocol IEEE 802.11b, thereby providing wireless data communication as the wireless LAN 112. The RF power amplifier 135 adjusts an output of the radio frequency (RF) from the RF converter/synthesizer 137. The RF converter/synthesizer 137 converts RF output from the antenna 133 into an intermediate frequency (IF) or converts IF output from the I/Q modem/synthesizer 139 into RF.

The I/Q modem/synthesizer 139 receives the IF from the RF converter/synthesizer 137 and converts the IF into a baseband signal (BBS), or receives a BBS from the baseband processor 141 and converts the BBS into IF.

The baseband processor 141 receives the BBS from the I/Q modem/synthesizer 139 and converts the BBS into a predetermined signal so as to perform an IEEE 802.11b MAC protocol and a physical coding sublayer (PCS) function thereon. Otherwise, the baseband processor 141 receives a signal output from the Ethernet MAC 143 and converts the received signal into a BBS.

The Ethernet MAC 143 carries out a data link layer function of IEEE 802.3. The Ethernet PHY 145 carries out a physical coding sublayer function of IEEE 802.3 and is electrically connected to the cable LAN 110 via a predetermined connector. The memory 147 stores a program corresponding to a protocol shown in FIG. 4 (described in more detail below).

The interface 150 includes an interface logic 151, a bus arbiter 153, and a memory 155. The memory 155 receives and stores printing data output from the cable client 190 connected to the cable LAN 110, or printing data output from each wireless client 160, 170, . . . , or 180. The bus arbiter 153 is typically a hardware module that arbitrates a bus between the printer processor 121 and the Ethernet MAC 143.

The interface logic 151 is a logic that interfaces the printer processor 121 and the bus arbiter 143. FIG. 3 represents a situation in which the LAN card 130 is internal (i.e., integrated with the printer processor 121). However, the present invention is not limited to the FIG. 3 configuration, and in a situation where the LAN card is external, the interface 150 of the LAN card 130 only consists of the interface logic 151.

Figure 4:
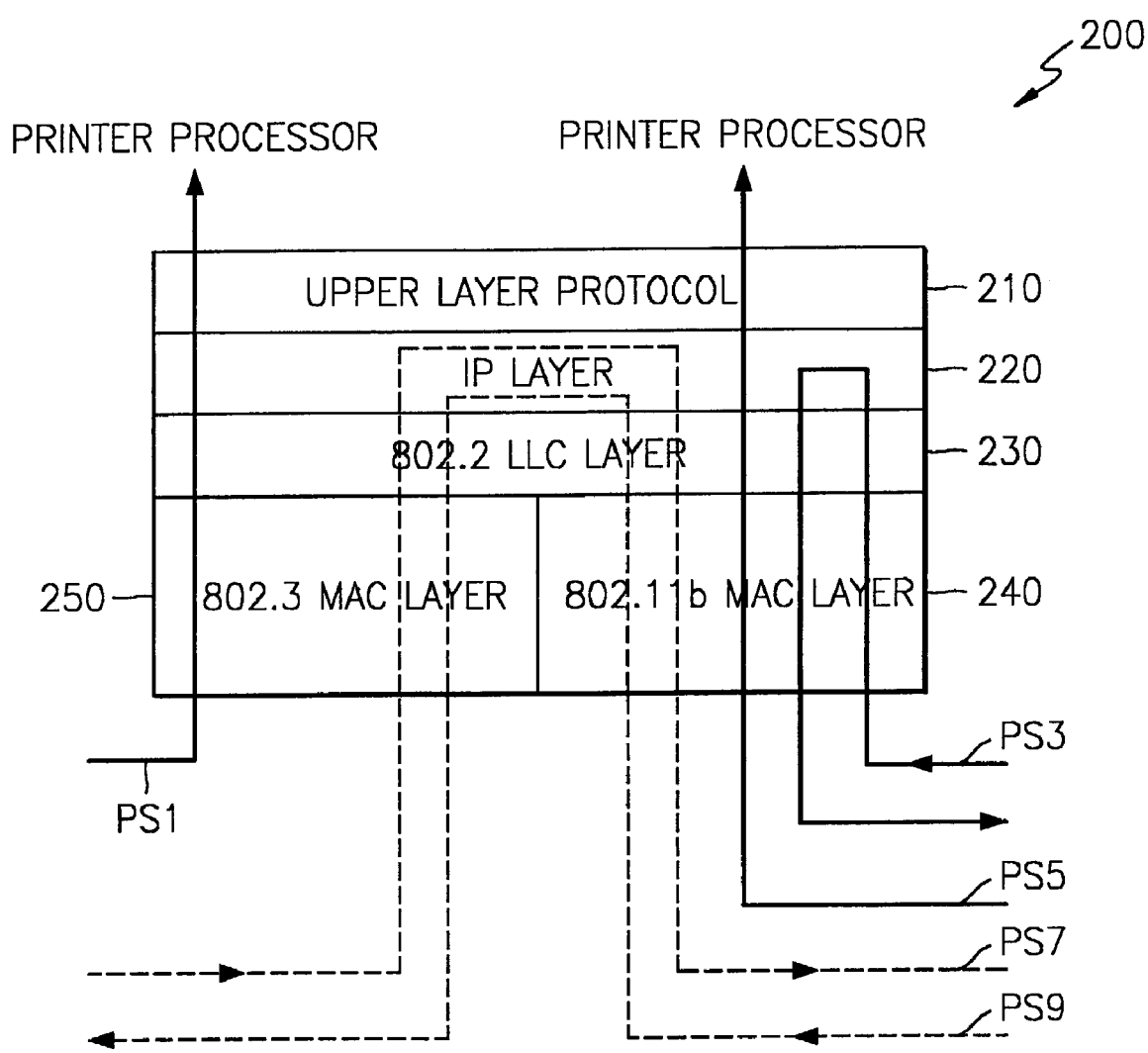
FIG. 4 is a schematic diagram of a protocol according to an embodiment of the present invention.
Figure 6:
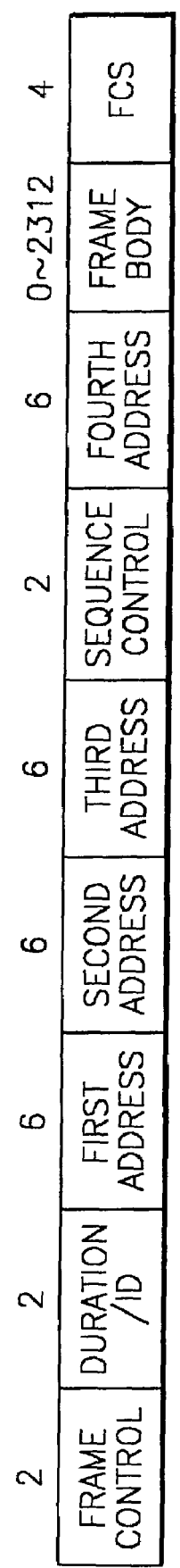
FIG. 6 is a view of a frame format of an IEEE 802.11b MAC layer.

FIG. 4 is a schematic diagram of a protocol 200 according to an embodiment of the present invention. The protocol 200 includes an upper layer protocol 210, an IP layer 220, an 802.2 logical link control (LLC) layer, an 802.3 media access control (MAC) layer 250, and an 802.11b MAC layer 240. FIG. 6 is a view of a frame format of the IEEE 802.11b MAC layer. The frame format shown in FIG. 6 is considered to be well known by those skilled in this art, and a detailed description thereof will be omitted here.

As shown in FIG. 6, the frame format of an IEEE 802.11b MAC layer includes a frame control, a duration/ID, a first address, a second address, a third address, a sequence control, a fourth address, a frame body, and a frame check sequence (FCS).

The frame control, the duration/ID, and the sequence control are 2 bytes, the first through fourth addresses are 6 bytes, the FCS is 4 bytes, and the length of the frame body is within a range from 0 to 2312 bytes.

Processes of the invention providing the access point function 130 are typically embodied in hardware and/or software, which can be stored in the memory 147, and represented as the baseband processor 141 and the Ethernet MAC 143 according to an embodiment of the invention. In FIG. 4, a path PS5, in which the network printer 120 receives printing data from the wireless client 160 and outputs the data, will be described. First, the wireless LAN card 130 having an access point function receives printing data from the wireless LAN card of the wireless client 160. Then, the wireless LAN card 130 via the baseband processor 141 can check a target IP address of the printing data by converting at a physical coding sublayer the received printing data into an IEEE 802.11b frame packet of a data link layer.

If the received target IP and an IP allocated to the wireless LAN card 130 are the same, the wireless LAN card 130 excludes a header from the printing data, converts the printing data into data that can be printed by the network printer 120, and outputs the converted data to the printer processor 121. Therefore, the printer processor 121 allows the network printer 120 to print the printing data transmitted from the wireless client 160.

A frame body included in the frame format of FIG. 6 holds data of an upper layer, i.e., data of a logical link control (LLC) layer and data of an IP layer. More specifically, the wireless LAN card 130 receives the printing data output from the wireless LAN card of the wireless client 160, excludes a header of an 802.11b MAC layer from the printing data, and compares a header of an IP layer included in the printing data with a header of an IP layer in the wireless LAN card 130. In the event that the IP address in the printing data and the IP address of the wireless LAN card 130 are the same, the wireless LAN card 130 converts the printing data into data that can be printed by the network printer 120, which is a destination of the printing data, and outputs the converted data to the printer processor 121.

In FIG. 4, a path PS3 where the wireless client 160 transmits data to another wireless client 170 or 180 via the wireless LAN card 130 having an access point function, and a path PS9 where the wireless client 160 transmits data to the cable client 190, which is electrically connected to the cable LAN 110, will be now described. The wireless client 160 can receive or transmit data from or to, or access the wireless client 170 or 180, using several protocols. In the following description, the transmission of data will be described with an IP address, which is one of the several protocols in this embodiment. The wireless client 160, 170, ..., or 180 each have their own IP address, and the frame body of FIG. 6 includes these IP addresses.

The wireless LAN card 130 of the network printer 120 receives data output from the wireless client 160 and compares a target IP address in the data with an IP address of the wireless LAN card 130. When the target IP address in the data is different from the IP address of the wireless LAN card 130, the wireless LAN card 130 transmits the received data to wireless client 170 or 180 or the cable client 190, one of which corresponds to the target IP address.

In FIG. 4, if the wireless LAN card 130 transmits the data from the wireless client 160 to another wireless client 170 or 180 (path PS3), the wireless LAN card 130 transmits data, which is received in an 802.11b MAC frame format, to the wireless client 170 or 180 in the 802.11b MAC frame format via the 802.2.LLC layer 230 and the IP layer 220, as shown in FIG. 4.

In FIG. 4, however, in the event that the wireless LAN card 130 transmits the data from the wireless client 160 to the cable client 190 (path PS9), the wireless LAN card 130 converts the data, which is received in the 802.11b MAC frame format, into an 802.3 frame format via the 802.2 LLC layer 230 and the IP layer 220, and transmits the converted data to the cable client 190 via the Ethernet PHY 145 of FIG. 3.

In FIG. 4, also, if the wireless LAN card 130 transmits the data from the cable client 190 to the wireless client 160, 170, ..., or 180 (path PS7), the wireless LAN card 130 converts data, which is received in an 802.3 MAC frame format via the cable LAN 110, into the 802.11b MAC frame format via the 802.2 LLC layer 230 and the IP layer 220 and then transmits the converted data to the wireless client 160, 170, ..., or 180.

In FIG. 4, the printing data, which is output from the cable client 190 in the 802.3 MAC frame format, is output to the printer processor 121 (PS1) via the Ethernet PHY 145, the Ethernet MAC 143, and the interface 150 shown in FIG. 3. That is, as can be seen from FIG. 4, the printing data, which is output from the cable client 190 in the 802.3 MAC frame format, is transmitted to the printer processor 121 via the 802.2 LLC layer 230, the IP layer 220, and the upper layer protocol 210.

Figure 5:
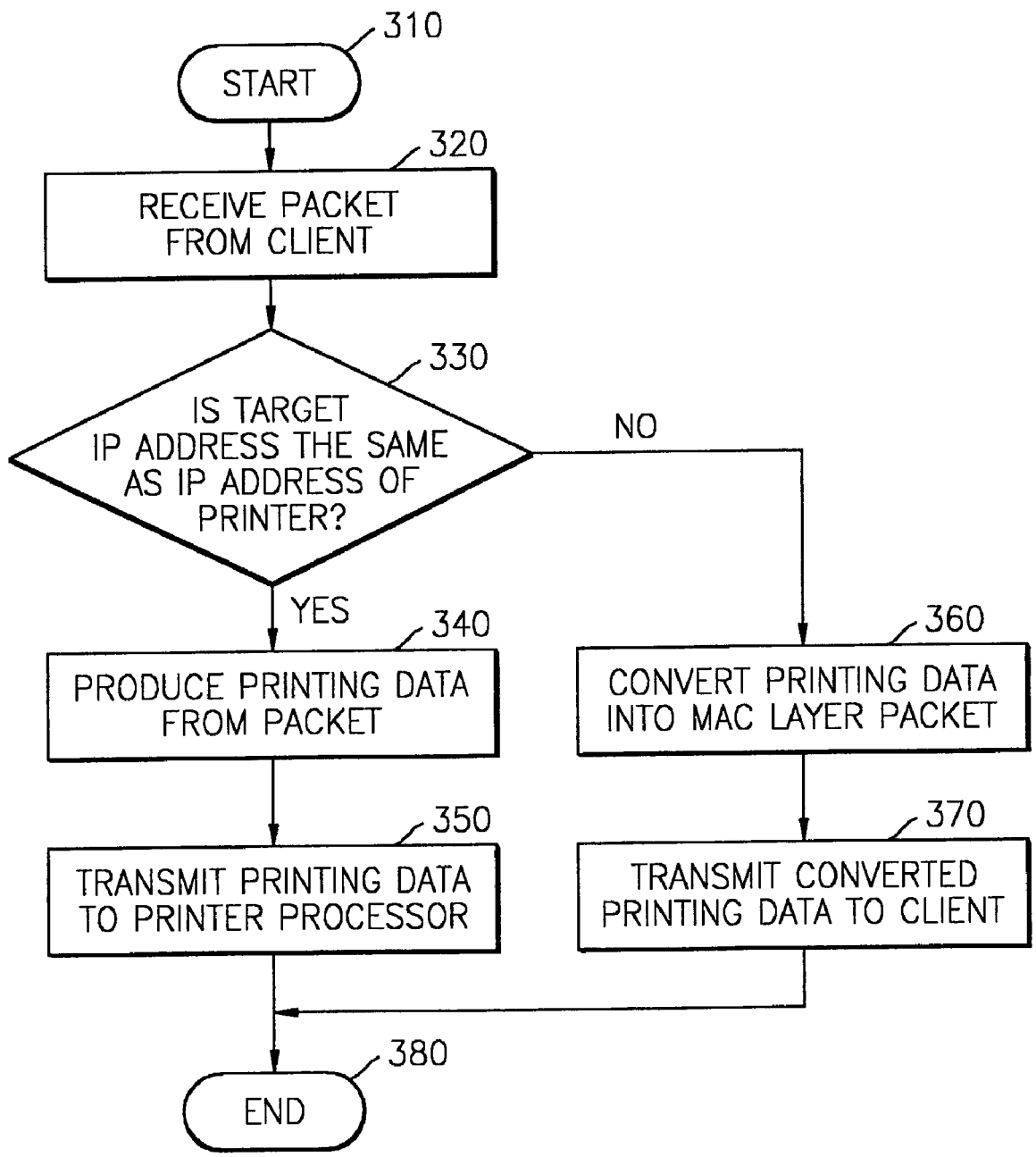
FIG. 5 is a flow chart of transmitting data using a network printer according to an embodiment of the present invention.

FIG. 5 is a flow chart of transmitting data using a wireless network printer according to an embodiment of the present invention. Referring to FIG. 5, the wireless LAN card 130 receives data from a client 160, 170, 180, or 190 and transmits the data to the printer processor 121 or another client 160, 170, 180, or 190.

More specifically, referring to FIGS. 2, 3, 4 and 5, at operation 320 the wireless LAN card 130 receives a packet or data from a client 160, 170, 180, or 190, and then at operation 330 compares a target IP address in the packet with an IP address of the wireless LAN card 130 (an IP address of the network printer 120).

Typically, the packet contains printing data. If at operation 330 the target IP address in the packet is the same as the IP of the wireless LAN card 130, at operation 340 the wireless LAN card 130 produces printing data from the packet so as to be identifiable as printing data by the network printer 120. At operation 350, printing data is transmitted to the printer processor 121 so that the network printer 120 prints the printing data by the printer processor 121.

On the contrary, if at operation 330 the target IP address in the packet is not identical with the IP of the wireless LAN card 130, at operation 360 the wireless LAN card 130 converts the packet into a MAC layer packet following paths PS3, PS7 and PS9 so as to transmit the packet to the client 160, 170, 180, or 190 one of which corresponds to the target IP address. Finally, at operation 370 the MAC layer packet is transmitted to the client 160, 170, 180, or 190.

As described above, a network printer is provided with a wireless LAN card that can be connected to a cable LAN and has an access point function transmitting data using the network printer, thereby providing a mobile access point. Also, the network printer reduces expenses and time spent in additionally installing a wireless LAN, and the present invention provides an access point in a wireless LAN and allows wire/wireless network printing.

Although the example embodiment of FIG. 4 is an access point function in a wireless network printer using IEEE 802.11b and the IEEE 802.3 as the wireless and wire data link layer standard protocols, respectively, the present invention is not limited to such configuration and any data link layer protocols as well as other higher Open System Interconnection (OSI) standard layer protocols can be used. The present invention can provide a wireless network printer in communication with a cable LAN comprising a wireless network access controller receiving predetermined data received from wireless clients and/or cable clients connected to the cable LAN and transmitting the predetermined data to the wireless clients, the cable client and/or a printer processor of the wireless network printer. Further, the access controller transmits/receives the predetermined data to/from the wireless clients using a wireless data link layer standard protocol with a transport layer protocol (for example, Internet protocol) and transmits/receives the predetermined data to/from the cable LAN using a wire data link layer standard protocol with another or same transport layer protocol used in the wireless network and the controller detects a target transport layer protocol of the received predetermined data to transmit the predetermined data to one of the clients corresponding to the target transport layer protocol. Typically, the wireless data link layer standard is IEEE 802.11b and the wire standard is IEEE 802.3 and the controller, in case of receiving data targeted for one of the cable clients from one of the wireless clients, converts the IEEE 802.11b data link layer to the IEEE 802.3 data link layer to transmit the received data to the one cable client. Therefore, the present invention can provide an office network system, comprising a cable LAN providing data communication among cable clients and Internet and wireless network printers each comprising a network access controller providing data communication among wireless clients, the cable clients, the printer and the Internet.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A method of transmitting data using a wireless network printer, comprising:
   providing in the printer a wireless LAN card that has an access point;
   receiving via the access point predetermined data transmitted from a wireless LAN card of a first wireless client; and
   transmitting via the access point the data to a wireless LAN card of a second wireless client.

2. The method of claim 1, wherein the access point function comprises detecting a target internet protocol of the data and transmitting the data to the wireless LAN card of the second wireless client corresponding to the target internet protocol.

3. The method of transmitting data using a wireless network printer, comprising:
   providing in the printer a wireless LAN card in communication with a cable LAN and having an access point;
   receiving via the access point predetermined data from a wireless LAN card of a wireless client; and
   transmitting via the access point the data to a cable client connected to the cable LAN.

4. The method of claim 3, wherein the access point comprises an operation of detecting a target Internet protocol of the data and transmitting the data to the cable client corresponding to the target Internet protocol.

5. A method of transmitting data using a wireless network printer comprising:
   providing in the printer a wireless LAN card that is connected to a cable LAN and has an access point;
   receiving via the access point predetermined data from a cable client connected to the cable LAN; and
   transmitting via the access point the data to a wireless LAN card of a wireless client.

6. The method of claim 5, wherein the access point comprises an operation of detecting a target Internet protocol of the data and transmitting the data to the wireless LAN card of the wireless client which corresponds to the target internet protocol.

7. A method of transmitting data using a wireless network printer comprising:
   providing in the printer a wireless LAN card that is connected to a cable LAN and has an access point;
   receiving via the access point first data transmitted from a first client; and
   detecting in the access point a target Internet protocol of the first data and transmitting via the access point second data to a second client which corresponds to the target Internet protocol.

8. The method of claim 7, wherein frame formats of the first data and second data are the same in the event that the first client is a wireless client having a first wireless LAN card and the second client is a wireless client having a second wireless LAN card.

9. The method of claim 7, wherein frame formats of the first data and second data are different from each other in the event that the first client is the first wireless client having a wireless LAN card and the second client is a cable client connected to the cable LAN.

10. The method of claim 9, wherein the frame format of the first data is IEEE 802.11b, which is converted to the frame format IEEE 802.3 of the second data.

11. The method of claim 7, wherein frame formats of the first data and second data are different from each other in the event that the first client is a cable client connected to the cable LAN and the second client is a wireless client having a wireless LAN card.

12. The method of claim 11, wherein the frame format of the first data is IEEE 802.3, which is converted to the frame format IEEE 802.11b of the second data.

13. The method of claim 7, wherein the second client is a printer processor if the target IP address is the same as the IP address of the wireless LAN and the second data is printing data produced from the first data.

14. The method of claim 7, wherein the second client is a printer processor if the target IP address is the same as the IP address of the wireless LAN and the second data is printing data produced by excluding a header from the first data and converting the first data into compatible data of the printer processor.

15. A method of transmitting data, comprising:
   connecting a wireless client to a wireless network printer including a wireless LAN card that is connected to a cable LAN and having an access point; and
   transmitting or receiving via the access point predetermined data by accessing an Internet connected to the cable LAN via the wireless LAN card.

16. A wireless network printer, comprising:
   a wireless LAN card receiving predetermined data from a wireless LAN card of a first wireless client, and transmitting via an access point function the data to a cable client connected to a cable LAN or a wireless LAN card of a second wireless client; and
   a printer processor receiving the data output from the wireless LAN card having the access point function.

17. The wireless network printer of claim 16, wherein the wireless LAN card having the access point transmits data received from the cable client, which is connected to the wireless LAN card having the access point, to the wireless LAN card of the first wireless client or the wireless LAN card of the second wireless client.

18. The wireless network printer of claim 16, wherein the wireless LAN card having the access point comprises:
   an access processor receiving the data from the wireless LAN card of the first wireless client, and transmitting the data to the cable client connected to the cable LAN or the wireless LAN card of the second wireless client; and
   an interface allowing communication between the access processor and the printer processor.

19. The wireless network printer of claim 18, wherein the interface comprises:
   a memory receiving and storing the data from the wireless LAN card of the first wireless client;
   a bus arbiter arbitrating a bus connected between the printer processor and the access processor; and
   an interface logic interfacing the printer processor and the access processor.

20. A wireless LAN card installed in a wireless network printer, the wireless LAN card comprising:
   an access processor receiving data output from a wireless LAN card of a first wireless client and transmitting the data to a cable LAN connected to the wireless LAN card or a wireless LAN card of a second wireless client; and
   an interface transmitting the data output from the access processor to an output terminal of the wireless LAN card.

21. The wireless LAN card of claim 20, wherein the access processor receives the data from the cable LAN and transmits the data to the wireless LAN card of the first client or the wireless LAN card of the second client.

22. The wireless LAN card of claim 20, wherein the interface comprises:
- a memory storing the data received from the wireless LAN card of the first wireless client;
- a bus arbiter arbitrating a bus connected between the output terminal of the wireless LAN card and the access processor; and
- an interface logic interfacing the output terminal of the wireless LAN card and the access processor.

23. A wireless network printer in communication with a cable LAN, comprising:
- a wireless network access controller receiving predetermined data received from wireless clients and/or cable clients connected to the cable LAN and transmitting the predetermined data to the wireless clients, the cable client and/or a printer processor of the wireless network printer.

24. The wireless network printer of claim 23, wherein the access controller transmits/receives the predetermined data to/from the wireless clients using a wireless data link layer standard protocol with a transport layer protocol and transmits/receives the predetermined data to/from the cable clients using a wire data link layer standard protocol with the transport layer protocol and the controller detects a target transport layer protocol of the received predetermined data to transmit the predetermined data to one of the clients corresponding to the target transport layer protocol.

25. The wireless network printer of claim 24, wherein the wireless data link layer standard is IEEE 802.11b and the wire standard is IEEE 802.3 and the access controller, in case of receiving data targeted for one of the cable clients from one of the wireless clients, converts the IEEE 802.11b data link layer to the IEEE 802.3 data link layer to transmit the received data to the one cable client.

26. The wireless network printer of claim 23, wherein the access controller transmits/receives the predetermined data to/from the wireless and cable clients using a layered protocol comprising respective layers of an upper layer protocol, an internet protocol layer, an IEEE 802.2 logical link control layer and a media access control layer comprising IEEE 802.3 and IEEE 802.11b protocols.

27. An office network system, comprising:
- a cable LAN providing data communication among cable clients and Internet; and
- wireless network printers each comprising a network access controller providing data communication among wireless clients, the cable clients, the printer and the Internet.

28. A network printer, comprising:
- a wireless LAN card that can be connected to a cable LAN and has an access point function allowing data communication using the network printer, thereby providing a mobile access point.

* * * * *